(12) United States Patent
Maleki et al.

(10) Patent No.: US 12,733,069 B2
(45) Date of Patent: Sep. 8, 2026

(54) CONTROL OF INACTIVITY TIMER TRIGGERING FOR NR UE

(71) Applicant: Telefonaktiebolaget LM Ericsson (publ), Stockholm (SE)

(72) Inventors: Sina Maleki, Malmö (SE); Ali Nader, Malmö (SE); Andres Reial, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 721 days.

(21) Appl. No.: 18/019,996

(22) PCT Filed: Aug. 3, 2021

(86) PCT No.: PCT/EP2021/071657

§ 371 (c)(1),
(2) Date: Feb. 6, 2023

(87) PCT Pub. No.: WO2022/029117

PCT Pub. Date: Feb. 10, 2022

(65) Prior Publication Data

US 2023/0300945 A1 Sep. 21, 2023

Related U.S. Application Data

(60) Provisional application No. 63/061,870, filed on Aug. 6, 2020.

(51) Int. Cl.
*H04W 76/38* (2018.01)
*H04L 5/00* (2006.01)
(Continued)

(52) U.S. Cl.
CPC ........... *H04W 76/38* (2018.02); *H04L 5/0094* (2013.01); *H04W 52/0216* (2013.01); *H04W 76/28* (2018.02)

(58) Field of Classification Search
CPC ............... H04L 5/0057; H04L 5/0094; H04W 52/0216; H04W 76/28; H04W 76/38; Y02D 30/70
See application file for complete search history.

(56) References Cited

U.S. PATENT DOCUMENTS 9,386,625 B2 * 7/2016 Malkamäki ........... H04W 76/28
2019/0053324 A1 2/2019 Tseng et al.
(Continued)

FOREIGN PATENT DOCUMENTS

CN 111148193 A 5/2020
EP 3611866 A1 2/2020
(Continued)

OTHER PUBLICATIONS

3GPP , "3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.1.0, Jul. 2020, 1-141.
(Continued)

*Primary Examiner* — Awet Haile
(74) *Attorney, Agent, or Firm* — Murphy, Bilak & Homiller, PLLC

(57) ABSTRACT

A method, in a wireless device, comprises, while in active time of connected-mode discontinuous-receive, c-DRX, mode, receiving (320) a scheduling message or control command from a network node. The method further comprises determining (330), based on the scheduling message or control command and based on one or more conditions associated with the scheduling message or control command, whether to trigger a starting or restarting of an inactivity timer.

14 Claims, 3 Drawing Sheets

(51) Int. Cl.

| | |
|---|---|
| ***H04W 52/02*** | (2009.01) |
| ***H04W 76/28*** | (2018.01) |

(56) References Cited

U.S. PATENT DOCUMENTS

| | | | | |
|---|---|---|---|---|
| 2019/0215897 | A1* | 7/2019 | Babaei | H04W 76/28 |
| 2020/0314671 | A1* | 10/2020 | He | H04W 72/23 |
| 2021/0203468 | A1* | 7/2021 | Yi | H04W 72/0453 |
| 2021/0289443 | A1* | 9/2021 | Nam | H04L 5/0023 |
| 2022/0183101 | A1* | 6/2022 | Jang | H04L 5/0057 |
| 2024/0129841 | A1* | 4/2024 | Marinier | H04W 48/16 |

FOREIGN PATENT DOCUMENTS

| | | | |
|---|---|---|---|
| EP | 3869874 | A1 | 8/2021 |
| WO | 2017028883 | A1 | 2/2017 |

OTHER PUBLICATIONS

3GPP , "3rd Generation Partnership Project; Technical Specification Group Radio Access Network; NR; Medium Access Control (MAC) protocol specification (Release 16)", 3GPP TS 38.321 V16.0.0, Mar. 2020, 1-141.

3GPP , "3rd Generation Partnership Project; Technical Specification Group Radio Access Network; NR; Physical layer procedures for control (Release 16)", 3GPP TS 38.213 V16.2.0, Jun. 2020, 1-176.

3GPP , "3rd Generation Partnership Project; Technical Specification Group Radio Access Network; NR; Physical layer procedures for data (Release 16)", 3GPP TS 38.214 V16.2.0, Jun. 2020, 1-163.

3GPP , "3rd Generation Partnership Project; Technical Specification Group Radio Access Network; NR; Radio Resource Control (RRC) protocol specification (Release 16)", 3GPP TS 38.321 V16.1.0, Jul. 2020, 1-151.

* cited by examiner

UE
NAS
RRC
PDCP
RLC
MAC
PHY
gNB
RRC
PDCP
RLC
MAC
PHY
AMF
NAS

CONTROL OF INACTIVITY TIMER TRIGGERING FOR NR UE

TECHNICAL FIELD

The present disclosure generally relates to the field of wireless network communications, and, more particularly, to the improved communication of inactivity timer operation controlling discontinuous receive (DRX) operation in wireless devices.

BACKGROUND

In specifications developed by the members of the Third-Generation Partnership Project (3GPP), a wireless device accessing and obtaining services from the wireless network is referred to as a user equipment (UE). The operation of these devices is governed by one or more protocol stacks, which are layered functionalities specified in detail by specifications published by the 3GPP. For devices operating according to the fifth-generation (5G) radio access technology commonly known as "NR," as developed by members of 3GPP, the UE's operation is governed by two protocol stacks—a user plane protocol stack, for handling uplink and downlink data associated with user operation of the device and/or applications running on the device, and a control plane protocol stack, for handling control signaling and command of the UE by the network. The user plane protocol stack and control plane protocol stack for NR are illustrated in FIG. 1 and FIG. 2, respectively. It will be appreciated that the user plane protocol stack for NR is similar to that in LTE, except for the addition of the Service Data Adaptation Protocol (SDAP) layer. Likewise, the control plane protocol stack for NR is similar to that in LTE, except that the non-access stratum (NAS) protocol is terminated in the Access and Management Mobility Function (AMF), rather than in a Mobility Management Entity (MME).

Of primary relevance to the present disclosure are the Medium Access Control (MAC) layer and the Radio Resource Control (RRC) layer, as found in the control plane protocol stack. The RRC layer performs configuration of connection-related and mobility-related operations of the UE. A key functionality of the Medium Access Control (MAC) layer in the NR protocol stack is the monitoring of the physical downlink control channel (PDCCH) for pages, scheduling messages, and other control information.

The MAC protocol is managed by a MAC entity, also referred to as a MAC unit, which may be configured through signaling over the Radio Resource Control (RRC) layer with a discontinuous receive (DRX) functionality that controls the UE's PDCCH monitoring activity. This monitoring activity looks for messages addressed according to any of several identifiers, including the C-RNTI, CI-RNTI, CS-RNTI, INT-RNTI, SFI-RNTI, SP-CSI-RNTI, TPC-PUCCH-RNTI, TPC-PUSCH-RNTI, and TPC-SRS-RNTI. DRX functionality for the NR UE is described in 3GPP TS 38.321, v16.1.0 (July 2020).

When using DRX operation, the MAC entity monitors PDCCH according to requirements found in the 3GPP TS 38.321 specification. When in RRC_CONNECTED mode, if DRX is configured, for all the activated Serving Cells, the MAC entity may monitor the PDCCH discontinuously using the DRX operation specified in clause 5.7 of 3GPP TS 38.321, otherwise the MAC entity shall monitor the PDCCH as specified in 3GPP TS 38.213, which specifies the physical layer procedures for control in an NR UE.

As specified in 3GPP TS 38.321, the RRC layer controls DRX operation by configuring the following parameters:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new uplink or downlink transmission for the MAC entity;

drx-RetransmissionTimerDL (per downlink hybrid automatic repeat request (HARQ) process except for the broadcast process): the maximum duration until a downlink retransmission is received;

drx-RetransmissionTimerUL (per uplink HARQ process): the maximum duration until a grant for uplink retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per downlink HARQ process except for the broadcast process): the minimum duration before a downlink assignment for HARQ retransmission is expected by the MAC entity;

drx-HARQ-RTT-TimerUL (per uplink HARQ process): the minimum duration before a uplink HARQ retransmission grant is expected by the MAC entity;

ps-Wakeup (optional): the configuration to start associated drx-onDurationTimer in case DCP is monitored but not detected;

ps-Periodic_CSI_Transmit (optional): the configuration to report periodic channel state information (CSI) during the time duration indicated by drx-onDurationTimer in case DCP is configured but associated drx-onDurationTimer is not started;

ps-TransmitPeriodicL1-RSRP (optional): the configuration to transmit periodic L1-RSRP report(s) during the time duration indicated by drx-onDurationTimer in case DCP is configured but associated drx-onDurationTimer is not started.

3GPP TS 38.321 also specifies that when a DRX cycle is configured, the Active Time includes the time while:

drx-onDurationTimer or drx-Inactivity Timer or drx-RetransmissionTimerDL or drx-RetransmissionTimerUL or ra-ContentionResolutionTimer (as described in clause 5.1.5) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

(All references to specific clauses are to clauses of 3GPP TS 38.321. Note also that the abbreviation "MAC CE" refers to a MAC control element.)

Further, when DRX is configured, the MAC entity shall:

1> if a MAC protocol data unit (PDU) is received in a configured downlink assignment:

2> start the drx-HARQ-RTT-TimerDL for the corresponding HARQ process in the first symbol after the end of the corresponding transmission carrying the downlink HARQ feedback;

2> stop the drx-RetransmissionTimerDL for the corresponding HARQ process.

1> if a MAC PDU is transmitted in a configured uplink grant:

2> start the drx-HARQ-RTT-TimerUL for the corresponding HARQ process in the first symbol after the end of the first repetition of the corresponding physical uplink shared channel (PUSCH) transmission;

2> stop the drx-RetransmissionTimerUL for the corresponding HARQ process.

1> if a drx-HARQ-RTT-TimerDL expires:

2> if the data of the corresponding HARQ process was not successfully decoded:

3> start the drx-RetransmissionTimerDL for the corresponding HARQ process in the first symbol after the expiry of drx-HARQ-RTT-TimerDL.

1> if a drx-HARQ-RTT-TimerUL expires:

2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:

2> stop drx-onDurationTimer;

2> stop drx-Inactivity Timer.

1> if drx-Inactivity Timer expires or a DRX Command MAC CE is received:

2> if the Short DRX cycle is configured:

3> start or restart drx-ShortCycleTimer in the first symbol after the expiry of drx-Inactivity Timer or in the first symbol after the end of DRX Command MAC CE reception;

3> use the Short DRX Cycle.

2> else:

3> use the Long DRX cycle.

1> if drx-ShortCycleTimer expires:

2> use the Long DRX cycle.

1> if a Long DRX Command MAC control element (CE) is received:

2> stop drx-ShortCycleTimer;

2> use the Long DRX cycle.

1> if the Short DRX Cycle is used, and [(SFN×10)+subframe number] modulo (drx-ShortCycle)=(drx-StartOffset) modulo (drx-ShortCycle):

2> start drx-onDurationTimer after drx-SlotOffset from the beginning of the subframe.

1> if the Long DRX Cycle is used, and [(SFN×10)+subframe number] modulo (drx-LongCycle)=drx-StartOffset:

2> if DCP is configured for the active downlink bandwidth part (BWP):

3> if DCP indication associated with the current DRX Cycle received from lower layer indicated to start drx-onDurationTimer, as specified in 3GPP TS 38.213; or 3> if all DCP occasion(s) in time domain, as specified in 3GPP TS 38.213, associated with the current DRX Cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap; or 3> if ps-Wakeup is configured with value true and DCP indication associated with the current DRX Cycle has not been received from lower layers:

4> start drx-onDurationTimer after drx-SlotOffset from the beginning of the subframe.

2> else:

3> start drx-onDurationTimer after drx-SlotOffset from the beginning of the subframe.

NOTE 1: In case of unaligned system frame number (SFN) across carriers in a cell group, the SFN of the SpCell is used to calculate the DRX duration.

1> if the MAC entity is in Active Time:

2> monitor the PDCCH as specified in 3GPP TS 38.213;

2> if the PDCCH indicates a downlink transmission:

3> start the drx-HARQ-RTT-TimerDL for the corresponding HARQ process in the first symbol after the end of the corresponding transmission carrying the downlink HARQ feedback, regardless of listen before talk (LBT) failure indication from lower layers;

NOTE 2: When HARQ feedback is postponed by PDSCH-to-HARQ feedback timing indicating a non-numerical kl value, as specified in 3GPP TS 38.213, the corresponding transmission opportunity to send the downlink HARQ feedback is indicated in a later PDCCH requesting the HARQ-ACK feedback.

3> stop the drx-RetransmissionTimerDL for the corresponding HARQ process.

3> if the PDSCH-to-HARQ feedback timing indicate a non-numerical kl value as specified in 3GPP TS 38.213:

4> start the drx-RetransmissionTimerDL in the first symbol after the PDSCH transmission for the corresponding HARQ process.

2> if the PDCCH indicates a uplink transmission:

3> start the drx-HARQ-RTT-TimerUL for the corresponding HARQ process in the first symbol after the end of the first repetition of the corresponding PUSCH transmission, regardless of LBT failure indication from lower layers;

3> stop the drx-RetransmissionTimerUL for the corresponding HARQ process.

2> if the PDCCH indicates a new transmission (downlink or uplink):

3> start or restart drx-Inactivity Timer in the first symbol after the end of the PDCCH reception.

1> if DCP is configured for the active downlink BWP; and

1> if the current symbol n occurs within drx-onDurationTimer duration; and

1> if drx-onDurationTimer associated with the current DRX cycle is not started as specified in this clause; and 1> if the MAC entity would not be in Active Time considering grants/assignments/DRX Command MAC CE/Long DRX Command MAC CE received and Scheduling Request sent until 4 milliseconds prior to symbol n when evaluating all DRX Active Time conditions as specified in this clause:

2> not transmit periodic SRS and semi-persistent SRS defined in 3GPP TS 38.214;

2> not report semi-persistent CSI configured on PUSCH;

2> if ps-Periodic_CSI_Transmit is not configured with value true:

3> if ps-TransmitPeriodicL1-RSRP is not configured with value true:

4> not report periodic CSI on PUCCH.

3> else:

4> not report periodic CSI on PUCCH, except L1-RSRP report(s).

1> else:

2> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:

3> not transmit periodic SRS and semi-persistent SRS defined in 3GPP TS 38.214;

3> not report CSI on PUCCH and semi-persistent CSI configured on PUSCH.

2> if CSI masking (csi-Mask) is setup by upper layers:

3> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:

4> not report CSI on PUCCH.

NOTE 3: If a UE multiplexes a CSI configured on PUCCH with other overlapping UCI(s) according to the procedure specified in 3GPP TS 38.213 clause 9.2.5 and this CSI multiplexed with other UCI(s) would be reported on a PUCCH resource outside DRX Active Time, it is up to UE implementation whether to report this CSI multiplexed with other UCI(s).

Regardless of whether the MAC entity is monitoring PDCCH or not, the MAC entity transmits HARQ feedback, aperiodic CSI on PUSCH, and aperiodic sounding reference signal (SRS) defined in 3GPP TS 38.214 when such is expected.

The MAC entity needs not to monitor the PDCCH if it is not a complete PDCCH occasion (e.g. the Active Time starts or ends in the middle of a PDCCH occasion).

UE energy consumption in connected mode, related to downlink operation, depends predominantly on the receiver (RX) on time. When the UE is ON, it frequently monitors the PDCCH. It turns out that in a significant amount of monitoring instances, nothing is scheduled for the UE; thereby some energy is wasted while the UE does not receive any data. Accordingly, improvements to UE operation are needed, to reduce UE energy consumption.

SUMMARY

When a UE is configured with connected mode DRX (C-DRX) as described in the background section above, the UE monitors PDCCH during the active time, and predominantly while the inactivity timer (IAT) is running. Under the current specifications, any PDCCH message starting a new MAC PDU or, as the MAC unit of the UE would recognize it, starting a new transmission, leads to a starting or restarting of the IAT. In many circumstances, the network has no need to schedule anything immediately after a command sent by the network is implemented by the UE, but the UE nevertheless restarts the IAT. The UE keeps monitoring PDCCH throughout the whole IAT even when no higher layer control/user-plane data is scheduled, which leads to additional power consumption.

Conversely, there are cases when the network might actually be interested in keeping the UE active after the receipt of a message sent by the network or the sending of a message by the UE, but the UE according to the current specifications does not do so. In the worst case, these scenarios could lead to connection failure. Thus, improvements in this behavior are also needed.

Several embodiments of the techniques and apparatuses described herein address these problems by providing solutions to clearly indicate whether a PDCCH reception or PUSCH or PUCCH transmission is associated with a possible continued transmission of control-plane or user-plane data. This allows the network to configure short onDuration periods for DRX and still have the possibility to reach the UE when necessary. This also helps reduce the unnecessary triggering of IAT.

According to the techniques described herein, the UE receives an additional indication of whether it has to trigger (or restart) IAT. In some embodiments, the network can further configure whether the IAT should be triggered fully (e.g., a default IAT) or partially (e.g., a second IAT length). The default IAT might be used, for example, in cases of user data activity where the communication involves external nodes/servers with longer communication delays (e.g., delays arising from awaiting TCP ACK), whereas for other types of communication, such as CSI report processing, a shorter IAT may be used.

The underlying mechanisms for the techniques disclosed herein can be one or more of the following, in various embodiments:

Downlink control information (DCI) based: e.g., a specific bitfield in a scheduling PDCCH indicates clearly whether the scheduled uplink or downlink signal should be considered as a new transmission.

MAC CE based: e.g., specific MAC CEs are defined as exempt from triggering IAT, or transmitted MAC CE payload contains such indication, or the network can configure which MAC CEs should trigger IAT and which ones do not trigger IAT.

Implicit approach: e.g., a specific condition in the UE implies triggering or not of IAT, e.g., a BSR>X, or a CSI report with link quality <Y leads to triggering IAT, but otherwise the UE does not have to trigger IAT. This feature can also be (pre-) configured by the network, in some embodiments.

An example method according to some embodiments of the techniques described herein is implemented in a wireless device, such as an NR UE. This example method comprises receiving a scheduling message or command from a network node, while operating in connected-mode discontinuous-receive (c-DRX) mode. The method further comprises determining, based on an indication included in or associated with the scheduling message or command and/or based on one or more conditions associated with the scheduling message or command, whether to trigger a starting or restarting of an inactivity timer. This example method may involve any of the mechanisms briefly summarized above, in various embodiments.

Another example method according to some embodiments of the techniques described herein is implemented in a network node, such as an NR gNB. This method comprises transmitting, to a wireless device, a scheduling message or command. This scheduling message or command includes or is associated with an indication of whether the wireless device is to trigger a starting or restarting of an inactivity timer. Once again, this example method may involve any of the mechanisms briefly summarized above, in various embodiments.

Other embodiments described herein include apparatuses corresponding to and configured to carry out the methods summarized above, and variants thereof.

With the techniques described herein, a network can configure short onDuration periods for DRX for a UE while improving the network's ability to reach the UE when necessary. The techniques also help reduce the unnecessary triggering of IAT.

DETAILED DESCRIPTION

Figures 1, 2:
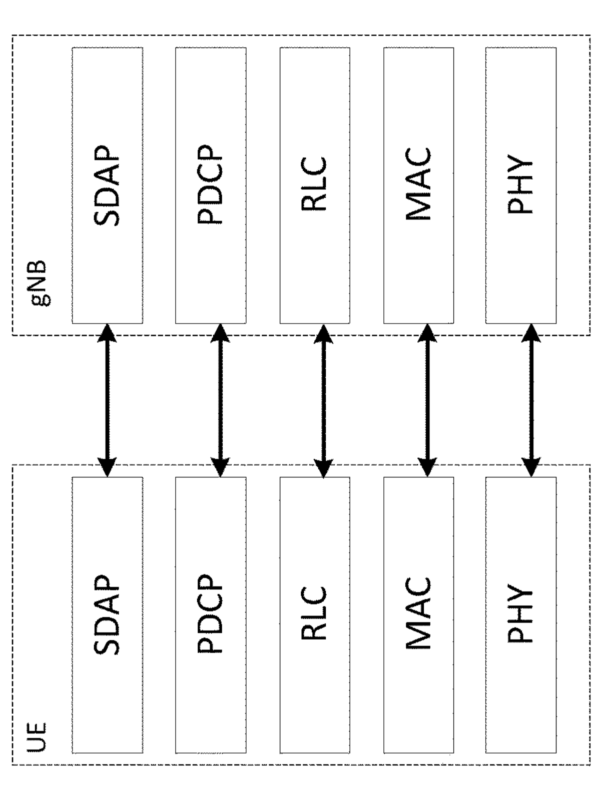
FIG. 1 illustrates the user plane protocol stack for NR.
FIG. 2 illustrates the control plane protocol stack for NR.

When a UE is configured with connected mode DRX (C-DRX) as described in the background section above, the UE monitors PDCCH during the active time, and predominantly while the inactivity timer (IAT) is running. As described before, in the current specification (3GPP TS 38.321, v16.1.0):

- 2> if the PDCCH indicates a new transmission (downlink or uplink):
  - 3> start or restart drx-Inactivity Timer in the first symbol after the end of the PDCCH reception.

As a consequence, any PDCCH starting a new MAC PDU or, as the MAC unit of the UE would recognize it, starting a new transmission, leads to a starting or restarting of the IAT. Nevertheless, the specification does not explicitly define how the MAC should define a new transmission. As a result, the UE triggers a starting or restarting of the IAT for any new MAC PDU, including, for example, a buffer status report (BSR) request and report. Note that the terms "starting" and "restarting" as used herein, in connection with the IAT or other timer, mean that the timer is initialized to a predetermined value and then allowed to run, such that if interrupted it would run for a predetermined length of time. "Starting" simply implies that the timer is not already running, while "restarting" implies that it is. A timer may count up or down, depending on the timer's implementation—the point here is that "starting or restarting" the timer begins (or begins again) a timed process.

In this specific example, the network asks the UE for a BSR, so first the UE triggers the IAT for the request, and then the UE also restarts the IAT after sending the report, even if the report is BSR0, i.e., in the event that the UE's uplink buffer is empty. Consequently, the UE keeps monitoring PDCCH throughout the whole IAT even while no higher layer control/user-plane data is scheduled.

Similar behavior applies to some other MAC CE commands, such as Transmission Configuration Information (TCI) States Activation/Deactivation for UE-specific PDSCH MAC CE, TCI State Indication for UE-specific PDCCH MAC CE, Timing Advance Command MAC CE, and so on. In most of these cases, the network has no need to schedule anything immediately after the command is implemented by the UE, but the UE nevertheless restarts the IAT, which leads to additional power consumption.

Any instances of triggering the IAT lead to extended PDCCH monitoring by the UE, and additional energy consumption. There is thus a need for improved methods for controlling additional PDCCH monitoring when the UE receives a scheduling PDCCH.

Conversely, there are cases when the network might actually be interested in keeping the UE active, but the UE, according to the current specifications, does not do so. For example, the network might, at the beginning of the onDuration, ask the UE to provide a CSI report. Such a CSI report is generated by layer 1 of the protocol stack and hence does not trigger the IAT. The network may, however, depending on the contents of the CSI report, want to ask the UE to take certain actions (e.g., change TCI state). However, in case the onDuration is configured short, for the sake of UE power saving, the UE might already have gone into DRX and thus be unavailable for such further command. This could lead to connection failure. Thus, improvements in this behavior are also needed.

Several embodiments of the techniques and apparatuses described herein address these problems by providing solutions to clearly indicate whether a PDCCH reception or PU×CH transmission is associated with a possible continued transmission of control-plane or user-plane data. This allows the network to configure short onDuration periods for DRX and still have the possibility to reach the UE when necessary. This also helps reduce the unnecessary triggering of IAT.

According to the techniques described herein, the UE receives an additional indication of whether it has to trigger (or restart) IAT. In some embodiments, the network can further configure whether the IAT should be triggered fully (e.g., a default IAT) or partially (e.g., a second IAT length). The default IAT might be used, for example, in cases of user data activity where the communication involves external nodes/servers with longer communication delays (e.g., delays arising from awaiting TCP ACK), whereas for other types of communication, such as CSI report processing, a shorter IAT may be used.

The underlying mechanisms for the techniques disclosed herein can be one or more of the following, in various embodiments:

- Downlink control information (DCI) based: e.g., a specific bitfield in a scheduling PDCCH indicates clearly whether the scheduled uplink or downlink signal should be considered as a new transmission.
- MAC CE based: e.g., specific MAC CEs are defined as exempt from triggering IAT, or transmitted MAC CE payload contains such indication, or the network can configure which MAC CEs should trigger IAT and which ones do not trigger IAT.
- Implicit approach: e.g., a specific condition in the UE implies triggering or not of IAT, e.g., a BSR>X, or a CSI report with link quality <Y leads to triggering IAT, but otherwise the UE does not have to trigger IAT. This feature can also be (pre-) configured by the network, in some embodiments.

Note that any of the example mechanisms may be combined, in various embodiments. In such a case, if at a given time any of the conditions lead to triggering IAT, the UE will restart the IAT, in some embodiments, unless the network configures the UE differently. This biases the UE towards being reachable, while still providing opportunities for improving power consumption by reducing the number of instances (or lengths of instances) during which the UE is unnecessarily active.

To further the techniques contemplated herein, a scenario is considered where the UE is configured with a specific C-DRX configuration, with this configuration specifying certain parameters that include at least a C-DRX on duration (onDuration) and an inactivity timer (TAT). The UE is additionally configured with one or more PDCCH occasions associated with one or more PDCCH candidates, for monitoring by the UE. Below, a set of mechanisms are described, by which the UE can determine whether it should trigger IAT or does not have to, based on the outcome of PDCCH monitoring, a network command, and the state of the UE (e.g., a buffer status, link quality, or the like).

A first category of mechanisms for regulating IAT behavior during DRX according to several embodiments of the presently disclosed techniques are DCI-based mechanisms. In embodiments utilizing these mechanisms, the UE receives a DCI as the scheduling PDCCH and, as part of the DCI, the new data indicator (NDI) bitfield is employed as an indicator of whether the scheduling PDCCH entails a new transmission or not, and thereby whether the UE should trigger IAT. In one approach, for example, if NDI indicates 1, i.e., the scheduled uplink or downlink transmission is designated as a new data transmission, the UE (specifically, the MAC entity/unit) interprets this as a new transmission irrespective of whether there is an associated MAC PDU provided to the UE and triggers IAT. If NDI is 0, on the other hand, the UE does not trigger IAT. Additionally, the network may configure one or more exceptions to this rule. For example, the network may instruct the UE (e.g., through an RRC configuration) that if the scheduling PDCCH indicates a request for a CSI report then the UE does not have to trigger IAT, even if NDI is toggled with 1. A similar rule might apply for when the scheduling PDCCH requests an SRS transmission. As an alternative, one or more of these exceptions may be programmed in the UE as fixed behavior, in accordance with system specifications.

In other embodiments, a specific bitfield can be configured by the network for some or all scheduling PDCCHs configured for the UE, where the bitfield clearly indicates whether the scheduled uplink or downlink operation is a new transmission or not. The MAC entity of the UE can then receive the indication, and triggers IAT if the underlying bitfield indicates a triggering of IAT. Alternative interpretations of the bitfield can be as a bitfield that indicates the UE should trigger the IAT or does not have to. For example, an additional bitfield can be configured in one or more of the DCI formats 0-0, 0-1, 0-2, 1-0, 1-1, and 1-2, with the new bitfield indicating the IAT trigger. For instance, one bit can be used in order to indicate new transmission, e.g., by toggling “1,” or not triggering IAT, by toggling “0”. In the event a DCI is not configured with the additional bitfield, the UE may follow the default legacy behavior with respect to triggering IAT, or potentially follow one or more other mechanisms disclosed herein, if so configured by the network. Alternatively, the UE behavior in case one or more of the DCIS are not configured with the additional bitfield can be separately configured by the network.

In some related embodiments, the network may configure the bitfield indicating whether to trigger IAT trigger in a trigger state if the transmission is user-data-related, i.e., subject to traffic burst arrival statistics, where the IAT is useful to capture possible following bursts, and in a non-trigger state if the transmission is not user-data-related, where a follow-up transmission is less likely. In other related embodiments, the non-triggering state may also be indicated if the transmission is user-data-related, but where the traffic type or previous burst arrival pattern suggests that next burst is not likely to arrive within the IAT duration, or if latency requirements for the traffic type are relaxed and a delay approaching an additional cDRX cycle can be tolerated.

In some embodiments, the UE can be configured with a set of search spaces (SSs) where the UE expects to decode PDCCH. In one approach, if the UE receives a scheduling PDCCH in the first SS or a first group of SS then reception of a PDCCH message triggers IAT, but if it receives the scheduling PDCCH in a second SS, or a second group of SSs, the UE does not have to trigger IAT.

Similarly, in some embodiments, if the UE is switched to a first BWP when it receives a message it should trigger IAT, but if it is switched to a second BWP, it does not have to trigger IAT. In a subset of these embodiments, the BWP switch is performed through a DCI.

In some embodiments, if the UE is additionally configured with a DCI format 2-6 or a wake-up signal (WUS), the network can configure the UE with an additional bitfield in the DCI indicating whether the UE should trigger IAT after waking up, even if nothing is scheduled during the ON duration, or additionally for how long, e.g., a multiple or fraction of IAT.

In a related realization, in the event that the UE receives multiple scheduling PDCCHs at the same time, if only one indicates a new transmission, based on the mechanisms described above, the UE should trigger IAT. In some embodiments, the network can configure exceptions to this rule. Note that here and elsewhere in this document, references to “the network” configuring the UE with rules, exceptions, parameters, or the like, mean that a network node, typically a radio access network node such as an NR base station (gNB) or LTE base station (eNB), provides the UE with configuration information. This may be done using RRC signaling, for example, and/or via a broadcast channel or broadcast signaling, such as in System Information Blocks (SIBs).

A second category of mechanisms for regulating IAT behavior during DRX according to several embodiments of the presently disclosed techniques are mechanisms based on a MAC CE, or related mechanisms. In some of these embodiments, for example, the network can configure the UE with a set of MAC CEs that the UE should respond to by triggering IAT unconditionally. For instance, the UE may be configured so that if the UE receives a MAC CE Scell activation command, it triggers IAT. Alternatively, in some embodiments, the UE's default behavior may be instead to follow the legacy behavior unless the network configures the UE with exceptions, e.g., one or more exceptions specifying that the UE does not have to trigger IAT for one or more MAC CEs, e.g., a TCI activation/deactivation MAC CE, a deactivation command MAC CE, a power headroom report MAC CE, a BSR MAC CE, a timing advance command MAC CE, and so on.

In some embodiments, a MAC CE transmission (which is carried as payload in PDSCH) contains an indication of whether the IAT should be triggered after the current transmission. This allows flexible control of IAT triggering without having to define triggering and non-triggering command lists ahead of time.

In some embodiments, the network can configure the UE to trigger IAT, or configure it to not to trigger IAT, based on a specific condition or several specific conditions. For example, the UE may be configured so that if in response to a BSR request the UE BSR is <=X (e.g., X=0), the UE may not have to trigger IAT, but if BSR>Y, the UE should trigger IAT (where Y can be qual to X or not). BSR thresholds regulating IAT triggering in this manner may be configured differently for different radio bearers carrying different services, in some embodiments.

Similarly, the network may configure the UE to activate IAT despite that the uplink transmission does not entail a MAC protocol data unit (PDU), e.g., a CSI report, but where a certain condition is fulfilled in the UE. For example, the network may configure the UE to trigger the IAT in the event that a link quality (link qualities, in case of multi-beam) reported in a CSI report is below a certain threshold (e.g., L1-RSRP<Y). With this approach, the network can, based on such report, take immediate actions such as switching the TCI state of the UE, since the UE is still available for receiving such command because the IAT is triggered. This may, in some embodiments, be irrespective of whether the CSI report is transmitted on PUSCH or PUCCH; in other embodiments the network may configure the IAT triggering depending on the channel the CSI report was transmitted on (PUSCH vs PUCCH).

In variations of any of the embodiments described above, the network may trigger the IAT fully or partially. For example, the network may want to invoke a complete IAT, i.e., an IAT of normal length, in the event of user data where external nodes are involved in the communication (e.g., awaiting TCP ACK/NAK). In other circumstances, such as after a CSI report, the NW may only require short availability of the UE and thereby only a fraction of IAT is needed. This fraction may either be preconfigured (e.g., a default IAT length versus a partial IAT length) in association with certain conditions, or embedded in the IAT triggering command from the network, in various embodiments.

Following are descriptions of specific apparatuses and generalized methods reflecting embodiments of the techniques described above. It should be appreciated that while the description below may in some instances use generalized language or terminology that varies from the examples and description above, it is intended that all of the techniques described above are encompassed by the methods described below. Thus, minor variations in terminology should be understood as being equivalent to or encompassing similar terms used above, depending on the context.

Figure 3:
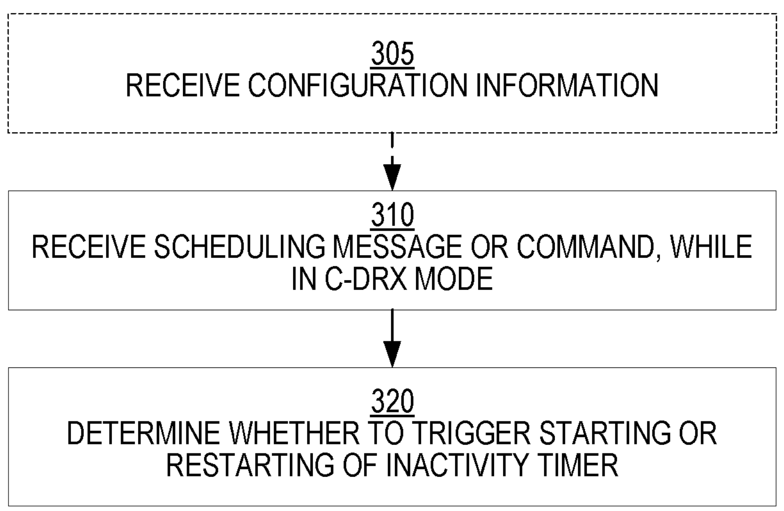
FIG. 3 is a process flow diagram illustrating an example method as carried out in a wireless device, such as an NR UE.

First, FIG. 3 illustrates an example method, according to several of the techniques described above, as implemented in a wireless device such as a user equipment (UE) configured for operation in an NR network. As shown at block 310, the method comprises the step of receiving a scheduling message or command from a network node, while operating in connected-mode discontinuous-receive (c-DRX) mode. As shown at block 320, the method further comprises the step of determining, based on an indication included in or associated with the scheduling message or command and/or based on one or more conditions associated with the scheduling message or command, whether to trigger a starting or restarting of an inactivity timer.

In some embodiments, as was discussed above, this receiving may comprise receiving downlink control information (DCI) targeted to the wireless device, where the DCI comprises a bit or bits indicating whether an uplink or downlink transmission scheduled by the DCI is to be considered a new transmission that triggers starting or restarting of the inactivity timer. In some embodiments and/or instances, this DCI may comprise a new-data indicator (NDI) bitfield indicating a new transmission, and the method may further comprise triggering a starting or restarting of the inactivity timer, as shown at block 330, based on this NDI bitfield.

In some embodiments, the receiving step illustrated at block 310 may comprise receiving a MAC CE, in which case the determining step shown in block 320 may comprise determining whether to trigger starting or restarting of the inactivity timer based on a type of MAC CE that is received. In some of these embodiments, the receiving may comprise receiving downlink control information (DCI) scheduling the MAC CE, with the DCI comprising a new-data indicator (NDI) bitfield indicating a new transmission. In some of these embodiments, the determination of whether to trigger starting or restarting the inactivity timer may comprise ignoring the NDI bitfield for at least a first type of MAC CE. In some embodiments, the method may comprise receiving configuration information indicating the first type of MAC CE, for which the associated NDI bitfield is to be ignored, prior to receiving said DCI. Block 305 of FIG. 3 shows the receiving of configuration information, which may include this or other information.

In some embodiments, the receiving shown at block 310 comprises receiving a MAC CE and the determining shown at block 320 comprises determining whether to trigger starting or restarting of the inactivity timer based on a bit or bits included in the MAC CE. In some embodiments, the receiving may comprise receiving a MAC CE and the determining comprises determining whether to trigger starting or restarting of the inactivity timer based on an outcome of a command carried by the MAC CE.

In some embodiments, the receiving shown at block 310 comprises receiving a command to transmit a buffer status report, and the determining shown at block 320 comprises determining whether to trigger starting or restarting of the inactivity timer by comparing a buffer status quantity to a predetermined threshold. Similarly, in some embodiments, the receiving shown at block 310 comprises receiving a command to transmit channel state information, and the determining shown at block 320 comprises determining whether to trigger starting or restarting of the inactivity timer by comparing a link quality metric to a predetermined threshold. In any of these embodiments, configuration information received prior to receiving the scheduling message or command may indicate this predetermined threshold.

In some embodiments, the receiving shown at block 310 comprises receiving a scheduling message in one of a plurality of predetermined search spaces, and the determining shown in block 320 is based on in which search space the scheduling message is received. Similarly, in some embodiments the receiving comprises receiving a scheduling message or command in one of a plurality of predetermined bandwidth parts (BWPs), and the determining is based on in which BWP the scheduling message or command is received.

In some embodiments, multiple scheduling messages may be received at the same time, and the determining to trigger starting or restarting the inactivity timer results in determining to trigger starting or restarting the inactivity if an indication or condition associated with any one of the multiple scheduling messages indicates that starting or restarting the inactivity should be triggered.

In some embodiments, the indication indicates that the wireless device is to trigger a starting or restarting of the inactivity timer with a shortened length, compared to a default length of the inactivity timer.

Figure 4:
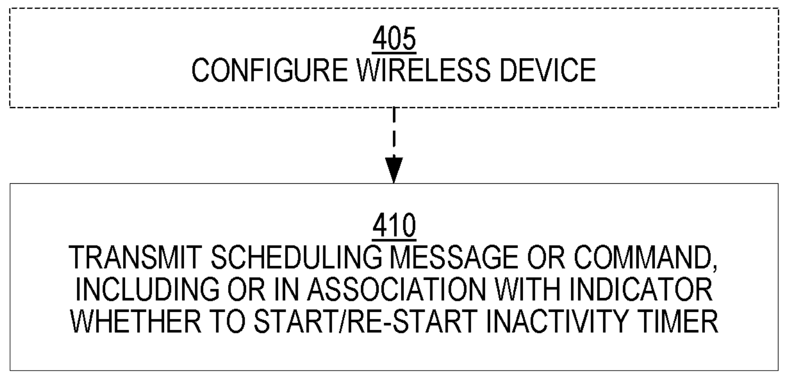
FIG. 4 is a process flow diagram illustrating an example method as carried out in a network node, such as an NR gNB or other base station.

FIG. 4 illustrates an example method, according to some of the techniques described herein, as implemented in a network node configured to communicate with a wireless device. This method, which may be understood as complementing the method shown in FIG. 3, comprises transmitting, to the wireless device, a scheduling message or command, as shown at block 410. This scheduling message or command includes or is associated with an indication of whether the wireless device is to trigger a starting or restarting of an inactivity timer.

In some embodiments, as discussed in detail above, this transmitting may comprise transmitting downlink control information (DCI) targeted to the wireless device, the DCI comprising a bit or bits indicating whether an uplink or downlink transmission scheduled by the DCI is to be considered a new transmission that triggers starting or restarting of the inactivity timer. In some embodiments, this DCI comprises a new-data indicator (NDI) bitfield indicating a new transmission. This may be used by the receiving wireless data to determine whether to trigger a starting or restarting of an inactivity timer, for example.

In some embodiments, the method comprises configuring the wireless device, prior to said transmitting, with an indication of one or more types of medium access control control elements (MAC CEs) which should not trigger starting or restarting of the inactivity timer by the wireless device. Block 405 of FIG. 4 shows a configuring of the wireless device by the network node; this configuration may include the sending of this indication of one or more types of MAC CEs and/or other configuration information.

In some embodiments, as discussed above, a wireless device or group of wireless devices is identified by the search space in which the scheduling message or command is transmitted. Thus, in some embodiments, the method shown generally in FIG. 4 may comprise the selecting of one of a plurality of predetermined search spaces in which to transmit the scheduling message or command, based on whether the wireless device is to trigger starting or restarting the inactivity timer in response to the scheduling message or command. Similarly, in some embodiments, the method may include selecting one of a plurality of predetermined bandwidth parts (BWPs) in which to transmit the scheduling message or command, based on whether the wireless device is to trigger starting or restarting the inactivity timer in response to the scheduling message or command.

Figure 5:
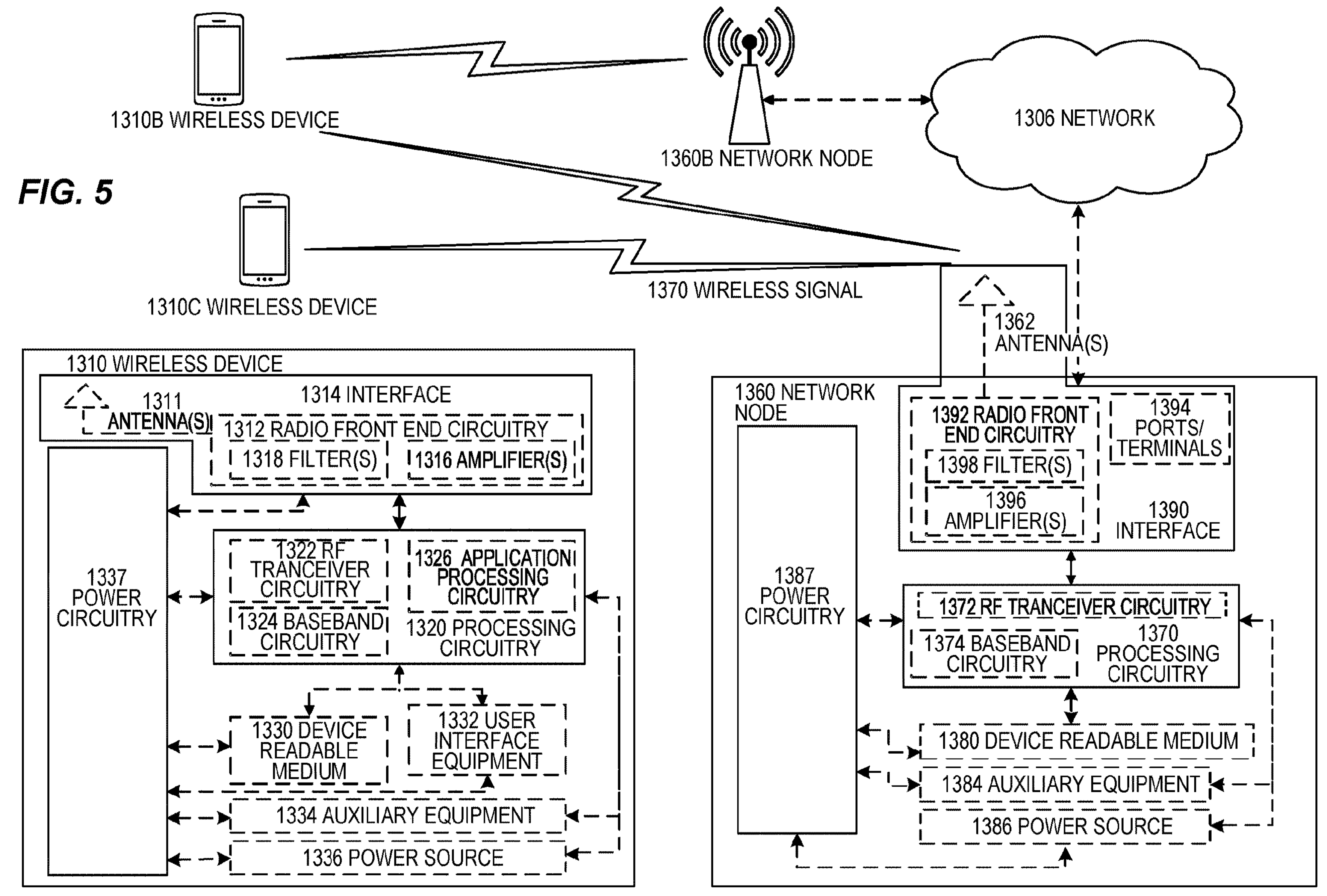
FIG. 5 illustrates components of an example wireless network, in which the techniques described herein may be implemented.

Although the subject matter described herein can be implemented in any appropriate type of system using any suitable components, the embodiments disclosed herein are described in relation to a wireless network, such as the example wireless network illustrated in FIG. 5. For simplicity, the wireless network of FIG. 5 only depicts network 1306, network nodes 1360 and 1360B, and WDs 1310, 1310B, and 1310C. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. It should be noted that the functionality of network node 1360 may be split between two or more physical nodes, such as according to central unit (CU) and distributed unit (DU) functionality. In such a case, the transmitting described herein is performed by the DU part, while the CU part may perform other functionality. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 5, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 5 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and a RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeBs. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, Wi-Fi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 can execute instructions stored in device readable medium 1380 or in memory within processing circuitry 1370. Such functionality can include providing any of the various wireless features, functions, or benefits discussed herein. In some embodiments, processing circuitry 1370 can include a system on a chip (SOC).

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units.

In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionalities can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality, including but not limited to, for example, functionality corresponding to RRC signaling, MAC-layer operations, and other protocol-stack-related functionality. The benefits provided by such functionality are not limited to processing circuitry 1370 alone or to other components of network node 1360, but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line-of-sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 5 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, Wi-Fi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality can include providing any of the various wireless features or benefits discussed herein. For example, processing circuitry 1320 can execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionalities can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the functionality described herein, including but not limited to, for example, functionality corresponding to RRC signaling, MAC-layer operations, and other protocol-stack-related functionality. The benefits provided by such functionality are not limited to processing circuitry 1320 alone or to other components of WD 1310, but are enjoyed by WD 1310 as a whole and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Notably, modifications and other embodiments of the invention(s) disclosed will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device, the method comprising:

while operating in connected-mode discontinuous-receive (c-DRX) mode, receiving a scheduling message or a control command from a network node to transmit channel state information; and determining, based on the scheduling message or the control command and based on one or more conditions associated with the scheduling message or the control command, whether to trigger a starting or restarting of an inactivity timer by comparing a link quality metric to a predetermined threshold.

2. The method of claim 1, wherein said receiving is during active time of the c-DRX mode.

3. The method of claim 1, wherein said receiving comprises receiving a scheduling message in the form of downlink control information (DCI).

4. The method of claim 1, wherein said receiving comprises receiving a control command in the form of a Medium Access Control Control Element (MAC CE).

5. The method of claim 1, wherein the conditions include one or more exceptions to a rule that would otherwise trigger starting or restarting of an inactivity timer.

6. The method of claim 1, wherein said receiving comprises receiving a medium access control control element (MAC CE) and wherein said determining comprises determining whether to trigger starting or restarting of the inactivity timer based on a type of MAC CE that is received.

7. The method of claim 6, wherein said receiving comprises receiving downlink control information (DCI) scheduling the MAC CE, the DCI comprising a new-data indicator (NDI) bitfield indicating a new transmission, and wherein said determining comprises ignoring the NDI bitfield for at least a first type of MAC CE.

8. The method of claim 7, wherein the method further comprises receiving configuration information indicating the first type of MAC CE, for which the associated NDI bitfield is to be ignored, prior to receiving said DCI.

9. The method of claim 1, wherein the method further comprises receiving configuration information indicating the predetermined threshold, prior to receiving said scheduling message or control command.

10. The method of claim 1, wherein said receiving comprises receiving a scheduling message in one of a plurality of predetermined search spaces, and wherein said determining is based on in which search space the scheduling message is received.

11. The method of claim 1, wherein said receiving comprises receiving a scheduling message or command in one of a plurality of predetermined bandwidth parts (BWPs) and wherein said determining is based on in which BWP the scheduling message or command is received.

12. The method of claim 1, wherein the method comprises receiving multiple scheduling messages at the same time and wherein the method further comprises determining to trigger starting or restarting the inactivity timer if a condition associated with any one of the multiple scheduling messages indicates that starting or restarting the inactivity should be triggered.

13. The method of claim 1, wherein an indication in the scheduling message or control command indicates that the wireless device is to trigger a starting or restarting of the inactivity timer with a shortened length, compared to a default length of the inactivity timer.

14. A wireless device comprising radio circuitry configured to communicate with one or more network nodes in a wireless communication network and further comprising processing circuitry operatively coupled to the radio circuitry and configured to:

while operating in connected-mode discontinuous-receive (c-DRX) mode, receive a scheduling message or a control command from a network node to transmit channel state information; and determine, based on the scheduling message or the control command and based on one or more conditions associated with the scheduling message or the control command, whether to trigger a starting or restarting of an inactivity timer by comparing a link quality metric to a predetermined threshold.

* * * * *